United States Patent

[11] 3,607,151

| [72] | Inventors | Michael J. Pryor<br>Woodbridge;<br>William H. Anthony, Guilford, both of Conn. |
|---|---|---|
| [21] | Appl. No. | 759,117 |
| [22] | Filed | Sept. 11, 1968 |
| [45] | Patented | Sept. 21, 1971 |
| [73] | Assignee | Olin Mathieson Chemical Corporation<br>Continuation-in-part of application Ser. No. 677,955, Oct. 25, 1967. |

[54] COMPOSITE CABLE SHEATHING HAVING AN ALUMINUM-SILICON LAYER
15 Claims, 4 Drawing Figs.

[52] U.S. Cl. .................................................. 29/196.2,
29/197, 29/197.5, 29/193
[51] Int. Cl. .................................................. B32b 15/00

[50] Field of Search .......................................... 29/196.2, 197, 197.5

[56] References Cited
UNITED STATES PATENTS

| 1,988,217 | 1/1935 | Sayles .......................... | 29/196.2 |
| 2,782,493 | 2/1957 | Russell ........................ | 29/196.2 |
| 3,400,450 | 9/1968 | Nock ........................... | 29/196.2 |
| 3,431,629 | 11/1969 | Stroup ......................... | 29/197.5 |

Primary Examiner—Hyland Bizot
Attorneys—Henry W. Cummings, Richard S. Strickler, Robert H. Bachman, Donald R. Matsko and Thomas P. O'Day ABSTRACT: This invention relates to a high strength aluminum alloy containing Zn, B, Mg and Si metallurgically bonded to a thin layer of an aluminum alloy containing at least 0.050% Si, which thin layer is also bonded to steel for use in both aerial and underground cable sheathing.

PATENTED SEP 21 1971

3,607,151

INVENTORS:
MICHAEL J. PRYOR
WILLIAM H. ANTHONY

BY Henry W. Cummings
ATTORNEY 3,607,151

COMPOSITE CABLE SHEATHING HAVING AN ALUMINUM-SILICON LAYER

This application is a continuation-in-part of application Ser. No. 677,955 filed Oct. 25, 1967, which is hereby incorporated into the present application by reference. Most underground cable sheathing now is made from either annealed Alloy 110 (99.9 percent pure Cu) or Alloy 220 (Copper Development Designation). The use of Alloy 110 predominates particularly in the medium and larger size cables.

Aerial cables are very often sheathed with annealed 1100 aluminum (Aluminum Association Designation).

The cable sheaths must provide adequate mechanical strength, suitable electrical conductivity and, for underground applications, high corrosion resistance.

There is an additional problem on underground cable sheathing with respect to rodent attack, particularly by gophers. For this reason, the gauge of copper cable sheathing used west of the Mississippi is 0.010″, whereas, that used east of the Mississippi (where gophers are comparatively absent) is only 0.005″.

Furthermore, the present scarcity and unstable price of copper has resulted in a search for other metallic systems which would be suitable for cable sheathing.

As an interim solution, stainless steel clad with copper has been investigated. However, its corrosion resistance at voids created in service in the exterior copper coating is too variable to warrant serious consideration. Evidently, copper is cathodic to stainless steels in many soils and promotes rapid perforation.

Three layer composites have also been proposed in U.S. Pat. No. 3,272,911. However, these composites suffer from the disadvantage of having poor corrosion resistance in soils.

A desirable cable sheathing should contain no copper alloy, should have acceptable electrical conductivity should be mechanically strong enough to prevent rodent or animal attacks, such as gophers, and should be as corrosion resistant as possible.

In the drawings

FIG. 1 is a sectional view of a typical cable sheath. FIG. 2 is an enlarged partial sectional view of the cable sheath described in application Ser. No. 677,955.

Figure 1:
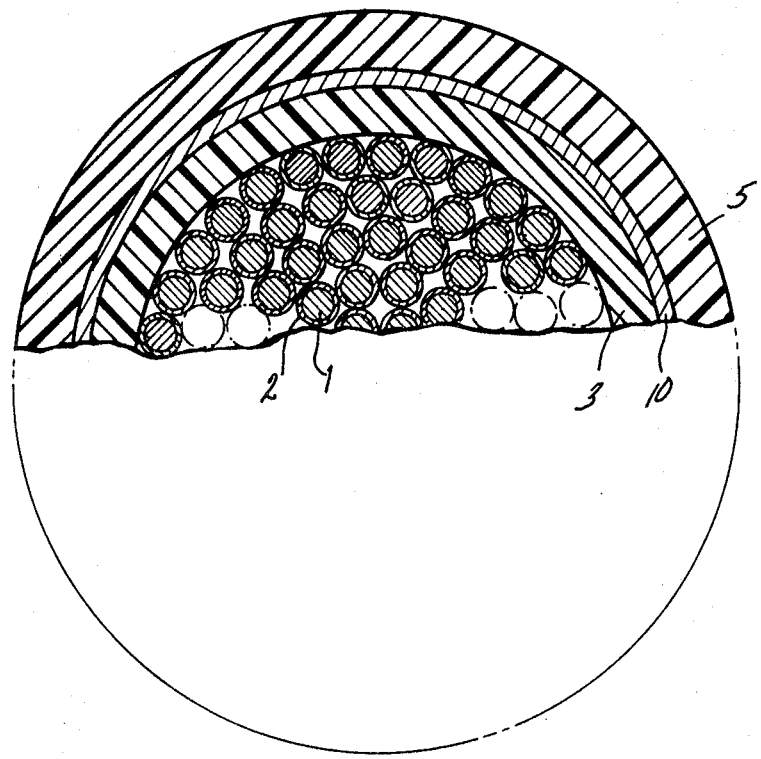

In FIG. 1, the conducting cables 1 are provided with insulation 2. A plurality of such insulated cables are provided within an inner jacket of insulation 3. The metallic sheath is shown generally at 10; its construction will be described in detail hereinafter. Finally, an external layer of insulation 5, also preferably made of a polymeric material, such as polyethylene, may be provided on the outside of the cable sheath.

As described in application, Ser. No. 677,955, it has been found that a composite cable sheath made of an aluminum alloy as the outer cladding, metallurgically bonded to a steel core is a satisfactory solution to the previously mentioned cable sheath problems.

Figure 2:
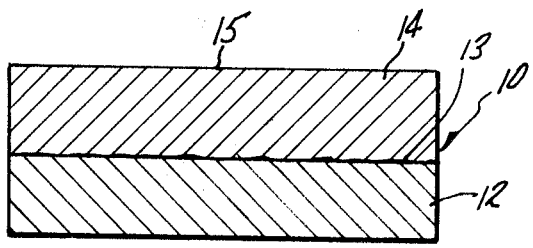

Thus, for example, the cable sheath 10, as shown in the enlarged view, FIG. 2 comprises an aluminum alloy 14 metallurgically bonded at 13 to steel core 12. If desired, the surface 15 may be corrugated (not shown) if an external insulation layer 5 in FIg. 1 is utilized.

Thus, as described in application, Ser. No. 677,955, it has been found that composites of aluminum alloys containing 0.2 percent to 2.0 percent zinc, 0.001 percent to 0.2 percent boron, and at least one hardening element, metallurgically bonded to steel, provides the necessary sacrificial corrosion resistance, electrical conductivity, and mechanical strength to withstand animal attacks. The aluminum alloy must have an electrical conductivity of at least 50 percent of the International Annealed Copper Standard. The boron content insures that the 50 percent level will be obtained. The zinc ensures the necessary galvanic protection with respect to steel. In addition to the zinc and boron, there must be at least one additional element present to provide strength for the aluminum component.

The preferred zinc content to ensure galvanic protection of steel is from 0.5 percent to 1.5 percent zinc. The preferred boron content is from 0.004 percent to 0.1 percent.

Thus, according to one embodiment of the invention described in application, Ser. No. 677,955, the aluminum component must contain from 0.2 percent to 2.0 percent zinc, from 0.001 percent to 0.2 percent boron for electrical conductivity and from 0.05 percent to 0.4 percent iron to provide strength. The silicon content must be no more than 0.2 percent. The remaining impurities limitations are 0.05 percent each, total 0.15 percent. The preferred zinc content is 0.5 percent to 1.5 percent and the preferred boron content is 0.02 percent to 0.2 percent.

According to another embodiment of the invention described in application Ser. No. 677,955, the aluminum component must contain from 0.2 percent to 2.0 percent zinc, from 0.001 percent to 0.2 percent boron, together with up to 0.4 percent copper, 0.3 percent to 1.4 percent magnesium, 0.4 percent to 1.2 percent silicon, up to 0.2 percent manganese, up to 0.1 percent chromium, other impurities up to 0.05 percent each, total of such other impurities, 0.15 percent maximum.

Preferably, the zinc content is 0.5 percent to 1.5 percent and the boron content of from 0.004 percent to 0.1 percent. Also, preferably, the silicon content is from 0.5 percent to 0.9 percent and the magnesium content is from 0.5 percent to 0.9 percent.

In the foregoing composites, mild steel having a carbon content as low as 0.01 percent may be used. There must be enough carbon in the steel so that a strength of at least 25,000 p.s.i. yield strength is provided. Steels having carbon contents higher than mild steel can also be used, provided they show an excess of 5 percent elongation in the condition used. The steel provides the strength for the composite so that it can effectively resist animal and rodent attack. If desired, of course, conventional alloying elements for steel such as chromium, manganese, nickel, cobalt in proportions commonly used in alloy steels may be used. However, from a standpoint of economics, it is usually less expensive to employ straight carbon steels. For some applications, if it is desired to provide even greater corrosion resistance insurance, conventional stainless steel of the 300 and 400 series and known modifications thereof, may be used. If this is done, the 300 series is preferred as, in general, the 300 series is less brittle than the 400 series. However, as mentioned previously, in general, ordinary carbon steel can easily provide the needed composite strength.

The previously described aluminum component must be present in an amount of at least 25 percent of the thickness of the composite. A preferred thickness ratio of the aluminum component to steel is 7 to 3.

When the composite is made of the previously mentioned 0.02 percent to 2 percent zinc, and 0.001 percent to 0.2 percent boron, 0.05 percent to 0.4 percent iron, aluminum alloy, only annealing at 1,000 to 1,100° F. for 1 to 60 minutes is required, prior to use. This treatment ensures softening of the iron core, as well as the aluminum cladding.

However, the zinc, boron, magnesium, silicon alloy requires heat treatment for optimum strength, ductility, and electrical conductivity. After the composite is cold rolled to final gauge, it should be heated at a temperature of 1,000° to 1,150° F. for a period of time from 1 to 60 minutes depending on the thickness. This treatment ensures softening of the iron core. The composite should then be cooled to room temperature at a rate of at least 400° F. per minute, room temperature being a temperature of less than 300° F.

The composite should then be heated at a temperature of from 250° to 400° F. for a period of time of from 15 minutes to 24 hours. This treatment increases the strength and conductivity of the aluminum component. The preferred range for this latter treatment is 300° F. to 325° F. for a period of time of 2 to 8 hours. This treatment results in a yield strength of at least 35,000 p.s.i. and a conductivity of at least 52 percent to IACS. The composite is then ready for forming the bundle shown in FIG. 1.

As disclosed in application, Ser. No. 677,955, in the case of aluminum components containing less than 0.5 percent silicon, including both the Al-Zn-B-Fe alloy and the Al-Zn-Mg-Si-B alloys, it is very desirable to provide an aluminum alloy layer having a thickness of 5 to 10 percent of the aluminum component which alloy layer contains at least 0.5 percent silicon to prevent bond degradation of the aluminum component steel bond during annealing.

Other methods of bonding the silicon containing layer to the aluminum component will be apparent to those skilled in the art.

After the formation of the aluminum component-aluminum silicon alloy composite, this composite is then bonded to the steel component.

In bonding the aluminum component to the steel, the face of the aluminum layer containing silicon is bonded to the iron base alloy.

The bonding process used to bond the aluminum component to the steel core is not critical so long as a sound metallurgical bond, free from intermetallics, is obtained. For example, the bond can be formed according to the Rader, Goldman, Winter process, described in Ser. No. 549,319, now U.S. Pat. No. 3,470,607 Briefly, this process comprises providing the core in a thickness less than one-half inch, providing the cladding in plate form in the thickness less than one-fourth inch, rolling together said core and cladding to form a green bond, cold rolling the resulting poorly bonded composite at least 50 percent. In the case of iron core composites, the green bond is formed with a rolling reduction of from 40 percent to 65 percent, with a subsequent cold rolling reduction requiring at least an additional 10 percent to give a total reduction of at least 60 percent. However, if desired, the bond can be formed by heating the core as described in U.S. Pat. No. 3,381,366 to a temperature of at least 300° F. Still another process described in Ser. No. 538,697 now abandoned, could be used in which the rolling operation causes one component only to recrystallize. However, the previously described Rader, Goldman, Winter process is preferred.

After the bond is formed, the composite is cold rolled to final gauge.

After the previously described annealing treatment, the composite is ready for the formation of the cable bundle shown in FIG. 1 according to conventional techniques well know to those skilled in the art.

It has been found according to the present invention that during the annealing treatment in order to soften the iron component, the bond between the aluminum component and the iron component is reduced in strength and ductility. It has been found that this is the case even where the aluminum component contains silicon as high as 0.75 percent.

It has been found that the bond is degraded due to the formation of intermetallic compounds at the core-clad interface.

According to the present invention, it has been found that this bond deterioration can be avoided by providing an additional layer of aluminum containing at least 0.75 percent silicon between the iron component and the previously described aluminum component. The silicon content of this additional aluminum layer should be from 0.75 percent to 5.0 percent silicon, preferably from 1 to 2 percent silicon. The layer may also contain other conventional alloying elements in addition to the silicon.

In the case where a two-membered composite is to be used, the addition of the silicon containing layer would provide a triclad article. In the case where the iron composite is clad on both sides with the aluminum component, a five-membered clad article to be used.

Figure 3:
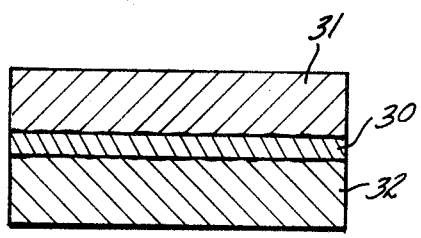
FIG. 3 is an enlarged partial sectional view of the three-membered cable sheath of the present invention.

Thus, as shown in FIG. 3, the aluminum layer containing silicon 30 would lie between the aluminum component 31 and the iron base alloy or steel component 32.

Figure 4:
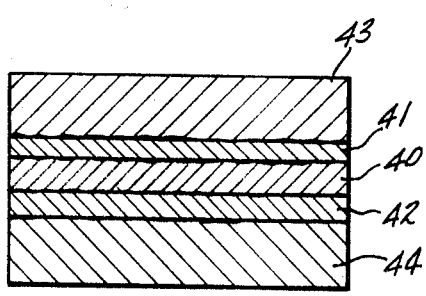
FIG. 4 is an enlarged partial sectional view of a five-membered cable sheath of the present invention. Cables in general are constructed as follows.

In FIG. 4 in the five-membered article, the steel component 40 is surrounded by two aluminum layers containing silicon 41 and 42. The aluminum components 43 and 44 are then found on the outside of the composite.

In either case, the thickness of the additional layer should be from 5 to 10 percent of the thickness of the aluminum component.

It has been found that when such a composite is annealed at a temperature of 1,000° to 1150° F. in order to soften the iron component and render the iron component ductile, there is no reduction in bond strength or ductility of the composite.

The silicon containing aluminum layers is bonded to the previously described aluminum component by any of the well-known treatments in the art to effect the formation of such a cladded product. For example, this can be done by the processes described in U.S. Pat. No. 3,381,366 issued May 7, 1968 to Winter, which may be summarized as follows: providing an aluminum core (the aluminum component) in plate form in a thickness less than one-half; providing a cladding (the aluminum alloy containing silicon) in plate form in a thickness less than one-fourth; heating said core to a temperature between 150° and 1,050° F; rolling together said core and cladding at a speed of at least 25 and preferably 100 feet per minute in one pass at a reduction between 35 80 percent, with the core and cladding coming together for the first time in the bite of the rolls, said cladding contacting the roll prior to contacting said core, with the included angle between core and cladding upon entering the rolls being in excess of 5°.

The magnesium content must be less than 1.0 percent, preferably less than 0.2 percent in order that a sufficient amount of silicon may be available to avoid bond degradation. It is, of course, understood that at the lowest silicon contents the amount of magnesium must be correspondingly small. The amount of other alloying elements in addition to magnesium and silicon may be as follows: copper, iron, chromium and nickel may be up to 1.5 percent. Titanium, zinc and manganese may be present up to 1 percent.

It will be, therefore, apparent to those skilled in the art that a number of alloying elements may be included in the silicon layer of the present invention without departing from the essential character of the layer of avoiding the aluminum-iron bond degradation.

The following examples illustrate the invention, but are in no way to be interpreted as limiting its scope:

Example I

A composite having an aluminum component containing 1 percent zinc, 0.1 boron, 0.2 percent iron and silicon 0.2 percent, others each 0.5 percent, total 1.5 percent was clad on both sides to a steel core having a carbon content of 0.25 percent, according to the teachings of U.S. Pat. No. 3,381,365. The resulting composite was about 0.009 inch thick (0.006 Al/0.003 Steel). After bonding, the composite was cold rolled and annealed at a temperature of 1,075° F. for 1 hour. The composite was then cooled to room temperature at a rate in excess of 400° F. per minute.

The composite was brittle and displayed lack of ductility. The bond was extremely weak and was peelable by hand.

Example II

The composite having the composition of example I was strip annealed in an electrical resistance furnace having a heating zone length of 9 feet and a width of 39 inches. The strip was passed through the furnace at a speed of 12 feet per minute. The length of the heating zone was 8 feet while the temperature was 1,340° to 1,360° F.

Upon cooling to room temperature at a rate in excess of 400° F. per minute, the composite was brittle and the bond was peelable by hand.

Example III

An aluminum alloy containing 0.75 percent silicon, 0.2 percent iron, 0.01 percent magnesium, all others less than 0.1 percent, total less than 0.5 percent, was bonded to an aluminum component having the composition of the aluminum component of example I according to the teachings of U.S. Pat. No. 3,381,366.

This composite was, in turn, bonded to a steel component having the same composition as the steel component in example I (0.25 percent carbon). The face of the aluminum layer containing silicon was bonded to the steel according to the teachings of application, Ser. No. 549,319. The resulting composite was about 0.0096-inch thick (0.006Al/0.0006 Al/0.003 Steel). The three-membered composite was then cold rolled and annealed at a temperature of 1,075° F.

Upon cooling to room temperature at a rate in excess of 400° F. per minute, the composite was ductile and the steel-aluminum bonds were very strong; it took an excess of 100 pounds per inch of width to break the bond.

Example IV

The three-membered composite of example III was strip annealed in the furnace described in example II and maintained at a temperature of 1,340° to 1,360° F. at a speed of 12 feet per minute.

Upon cooling to room temperature at a rate in excess of 400° F. per minute, the composite was ductile and the steel-aluminum bonds were very strong; it took an excess of 100 pounds per inch of width to break the bond.

Example V

An aluminum component having a zinc content of 1 percent, a boron content of 0.1 percent together with 0.2 percent copper, 1 percent magnesium and 0.45 percent silicon, 0.1 percent manganese and 0.5 percent chromium, others up to 0.5 percent each, total others 0.15 percent maximum, was bonded to a steel component containing 0.25 percent carbon according to the teachings of application, Ser. No. 549,319. The composite was about 0.009 inch thick (0.006 Al/0.003 Steel). The composite was then cold rolled to final gauge and annealed at a temperature of 1,075° F. for 1 hour.

Upon cooling to room temperature at a rate in excess of 400° F. per minute, the composite was found to lack ductility and the bond was peelable by hand.

Example VI

Example V was repeated using the furnace and the strip annealing conditions described in examples II and IV.

Upon cooling to room temperature at a rate in excess of 400° F. per minute, the composite was brittle and the bond was weak and peelable by hand.

Example VII

An aluminum alloy containing 0.75 percent silicon, 0.2 percent iron, 0.01 percent magnesium, all other less than 0.1 percent, total less than 0.5 percent, was bonded to the aluminum component of example I according to the teachings of U.S. Pat. No. 3,381,366. This composite was then bonded to a steel core containing 0.25 percent carbon with the silicon containing layer forming the interface with the steel. The bonding technique was that described in application, Ser. No. 549,319. The resulting composite was approximately 0.0096-inch thick (Al/0.0006 Al/0.003 Steel). The composite was heated to a temperature of 1,075° F. for 1 hour.

Upon cooling to room temperature at a rate in excess of 400° F. per minute, the composite was found to be ductile and the bond was very strong; it took an excess of 100 pounds per inch of width to break the bond.

Example VIII

The three-membered composite of example VII was strip annealed using the furnace and the conditions described in examples II and IV.

Upon cooling to room temperature at a rate in excess of 400° F. per minute, the composite was found to be ductile and the bonds were very strong. It required an excess of 100 pounds per inch of width to break the steel-aluminum bond.

Example IX

A five-membered composite was prepared in which a steel component was clad on both sides with composite aluminum layers. The composite aluminum layers were made up of an aluminum component and an aluminum alloy layer. The aluminum component had the composition disclosed in example I. The aluminum alloy layers contained 0.75 percent silicon. The two aluminum alloys were first clad to the two aluminum components according to the teachings of U.S. Pat. No. 3,381,366. These two aluminum composites were then bonded to the steel core according to the teachings of application, Ser. No. 549,319. The resulting composite was approximately 0.19-inch thick (0.006 Al/0.0006 Al/0.003 Steel/0.0002 Al/0.002 Al). The five-membered composite was strip annealed, using the furnace and conditions used in examples II and IV.

Upon cooling to room temperature at a rate in excess of 400° F. per minute, the composite was found to be ductile and the bonds were very strong. It required an excess of 100 pounds per inch of width to break the steel-aluminum bonds.

It is to be understood that the invention is not limited to the illustrations described and shown herein which are deemed to be merely illustrative of the best modes of carrying out the invention, and which are susceptible of modifications of form size, arrangement of parts and detail of operation, but rather is intended to encompass all such modifications which are within the spirit and scope of the invention as set forth in the appended claims.

What is claimed is:

1. A composite having a steel core metallurgically bonded to an aluminum alloy consisting essentially of silicon at least 0.5 percent, magnesium less than 1.0 percent, balance essentially aluminum, said aluminum alloy being, in turn, bonded to an aluminum component consisting essentially of from 0.2 to 2.0 percent zinc, 0.001 to 0.2 percent boron and at least one additional element which provides strength selected from the group consisting of:
   A. iron from 0.05 to 0.4 percent; and
   B. silicon from 0.4 to 1.2 percent magnesium form 0.3 to 1.4 percent.
balance essentially aluminum, said aluminum component having an IACS conductivity of at least 50 percent.

2. A composite according to claim 1 wherein said aluminum alloy contains from 0.75 to 5.0 silicon.

3. A composite according to claim 2 wherein the zinc content of the aluminum component is from 0.5 to 1.5 percent.

4. A composite according to claim 2 wherein the thickness of the said aluminum alloy is from 5 to 10 percent of the thickness of the aluminum component.

5. A composite according to claim 2 wherein the thickness of the aluminum component is at least 25 percent of the thickness of the composite.

6. A composite according to claim 2 wherein the ratio of the thickness of the aluminum component to steel is 7 to 3.

7. A composite according to claim 2 wherein aluminum alloy layers are present on both sides of the steel component.

8. A composite according to claim 7 wherein said aluminum component is bonded to both said aluminum alloy layers.

9. A composite according to claim 2 wherein the steel component has a yield strength of at least 25,000 p.s.i.

10. A composite according to claim 2 wherein said additional element is (A) iron from 0.05 to 0.4 percent.

11. A composite according to claim 2 wherein the additional element is (B) silicon from 0.4 to 1.2 percent plus magnesium from 0.3 to 1.4 percent.

12. A composite according to claim 2 wherein said aluminum alloy contains copper up to 1.5 percent, iron up to 1.5 percent, chromium up to 1.5 percent, nickel up to 1.5 percent, titanium up to 1 percent, zinc up to 1 percent and manganese up to 1 percent.

13. A composite cable sheath comprising a steel core metallurgically bonded to an aluminum alloy consisting essentially of silicon at least 0.5 percent, magnesium less than 1.0 percent, balance essentially aluminum, said aluminum alloy being, in turn, bonded to an aluminum component consisting essentially of from 0.2 to 2.0 percent zinc, 0.001 to 0.2 percent boron and at least one additional element which provides strength selected from the group consisting of:

A. iron from 0.05 to 0.4 percent; and
B. silicon from 0.4 to 1.2 plus magnesium from 0.3 to 1.4 percent, balance essentially aluminum, said aluminum component having an IACS conductivity of at least 50 percent.

14. A composite according to claim 13 wherein said aluminum alloy contains from 0.75 to 5.0 percent silicon.

15. A composite according to claim 14 wherein the thickness of the said aluminum alloy is from 5 to 10 percent of the thickness of the aluminum component.

UNITED STATES PATENT OFFICE
CERTIFICATE OF CORRECTION

Patent No. 3,607,151　　　　　　　　Dated September 21, 1971

Inventor(s) Michael J. Pryor et al.

It is certified that error appears in the above-identified patent and that said Letters Patent are hereby corrected as shown below:

In the Title Page, correct the spelling of the Attorneys name "Matsko" to read ---Motsko---.

In Column 1, line 5, the sentence "Most underground..." should be a separate paragraph;

In Column 1, line 39, the sentence "FIG. 2..." should be a separate paragraph;

In Column 1, line 45, the sentence "Cables in..." should be a separate paragraph;

In Column 1, line 65, the word "FIg." should read ---FIG.---;

In Column 1, line 75, the word "ensures" should read ---insures---.

In Column 2, line 5, the word "ensure" should read ---insure---;

In Column 2, line 61, the word "ensures" should read ---insures---;

In Column 2, line 68, the word "ensures" should read ---insures---.

In Column 4, line 19, after the words "one-half" insert ---inch---;

UNITED STATES PATENT OFFICE
CERTIFICATE OF CORRECTION

Patent No. 3,607,151　　　　　　　　　Dated September 21, 1971

Inventor(s) Michael J. Pryor et al.

It is certified that error appears in the above-identified patent and that said Letters Patent are hereby corrected as shown below:

In Column 4, line 21, after the words "one-fourth" insert ---inch---;

In Column 4, line 24, correct "35 80 percent" to read ---35 and 80 percent---;

In Column 4, line 48, "0.1 boron" should read ---0.1 percent boron---.

In Column 5, line 65, "(Al/0.0006 Al/0.003 Steel)" should read ---(0.006Al/0.0006 Al/0.003 Steel)---.

In Column 6, line 19, "0.19-inch" should read ---0.019-inch---

In Column 6, line 20, the sentence "The five-membered..." should be a separate paragraph;

In Column 6, line 46, after "0.4 to 1.2 percent" insert ---plus---;

In Column 6, line 46, the word "form" should read ---from---;

In Column 6, line 51, after "0.75 to 5.0" insert ---percent---.

Signed and sealed this 18th day of April 1972.

(SEAL)
Attest:

EDWARD M. FLETCHER, JR.　　　　　ROBERT GOTTSCHALK
Attesting Officer　　　　　　　　　Commissioner of Patents